(12) United States Patent
Toth

(10) Patent No.: US 11,608,900 B2
(45) Date of Patent: *Mar. 21, 2023

(54) SAFELY RELEASE BLEEDER VALVE

(71) Applicant: Patricia Toth, Sewell, NJ (US)

(72) Inventor: Patricia Toth, Sewell, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/478,969

(22) Filed: Sep. 20, 2021

(65) Prior Publication Data

US 2022/0003323 A1 Jan. 6, 2022

Related U.S. Application Data

(63) Continuation of application No. 16/416,552, filed on May 20, 2019, now Pat. No. 11,131,390.

(51) Int. Cl.
| | | |
|---|---|---|
| *F16K 1/30* | (2006.01) | |
| *F16K 1/38* | (2006.01) | |
| *F16K 17/34* | (2006.01) | |
| *F17C 13/04* | (2006.01) | |

(52) U.S. Cl.
CPC .............. *F16K 1/305* (2013.01); *F16K 1/307* (2013.01); *F16K 1/385* (2013.01); *F16K 17/34* (2013.01); *F17C 13/04* (2013.01); *F17C 2205/0332* (2013.01)

(58) Field of Classification Search
CPC .......... F16K 1/385; F16K 1/305; F16K 1/307; F16K 17/34; F17C 2205/0332; F17C 13/04
USPC ......................................... 251/333, 123, 124
See application file for complete search history.

(56) References Cited

U.S. PATENT DOCUMENTS

| | | | | |
|---|---|---|---|---|
| 453,265 A * | 6/1891 | Mayo | .............. | F16K 1/42 251/333 |
| 1,548,091 A * | 8/1925 | Lombardi | ............... | F16K 24/04 251/216 |
| 1,698,826 A * | 1/1929 | Shaffer | ..................... | F16K 1/38 138/46 |
| 2,091,874 A * | 8/1937 | Neuhaus | .................. | F16K 17/00 251/297 |
| 2,420,544 A * | 5/1947 | Jones | ..................... | C10G 19/00 422/224 |
| 2,635,482 A * | 4/1953 | Hehemann | .............. | F16K 31/60 74/553 |
| 2,887,899 A * | 5/1959 | Urbas | ..................... | F16K 31/60 29/896.5 |
| 3,094,137 A * | 6/1963 | Burke | .................. | B21C 37/298 251/216 |
| 5,123,436 A * | 6/1992 | Koechlein | .......... | G05D 16/0666 137/12 |
| 11,131,390 B1 * | 9/2021 | Toth | ....................... | F16K 1/385 |
| 2003/0062493 A1 * | 4/2003 | Lin | ............. | F16K 1/48 251/84 |
| 2005/0263208 A1 * | 12/2005 | MacNeal | ................ | F16K 1/302 141/301 |
| 2016/0002993 A1 * | 1/2016 | MacGregor | ........... | E21B 21/103 175/218 |

* cited by examiner

*Primary Examiner* — Umashankar Venkatesan
(74) *Attorney, Agent, or Firm* — Ashok Tankha

(57) ABSTRACT

A safety release bleeder valve serving as a plug includes a barrel having an exterior surface and an interior throughbore surface for matingly receiving a plug having a top end with exterior threads and an interior socket for receiving a driver tool for moving the plug between an open venting state and a closed non-venting state.

11 Claims, 14 Drawing Sheets

SAFELY RELEASE BLEEDER VALVE

BACKGROUND OF THE INVENTION

Technical Field of the Invention

The present invention relates, generally, to a safety release bleeder valve for a pressurized pipe and, more particularly, to a device for releasing pressure that has built up behind the valve.

Federal regulations regarding open-ended valves or lines, e.g., Title 40, Code of Federal Regulations, § 60.482-6, require each open-ended valve or line shall be equipped with a cap, blind flange, plug or a second valve with the cap, blind flange, plug or second valve sealing the open-end at all times except during operations requiring fluid flow.

Further, environmental and safety regulations mandate that all bleeder valves in a gas and liquid hydrocarbon and chemical service require metal plugs to be installed downstream of the valve to ensure a positive shut off.

The present invention provides a novel safety plug to be used in lieu of a standard plug that can help to minimize the risk of removing an unvented plug.

A primary object of the present invention is to provide a safety release bleeder valve serving as a plug.

A further object of the present invention is to provide a safety release bleeder valve comprising a barrel and plug.

Another object of the present invention is to provide the barrel having an exterior surface and an interior throughbore surface matingly receiving the plug.

An additional object of the present invention is to provide the barrel having a top end and a bottom end with the top end having a polygonal shape to receive a tool for applying torque during installation and removal of the safety release bleeder valve.

An additional object of the present invention is to provide the barrel bottom end exterior with tapered threads for sealingly mounting the barrel to a pressurized vessel/pipe.

A further object of the present invention is to provide the barrel bottom end interior with a venturi-like constriction comprising a throughbore wall diametrically decreasing forming a mating valve seat member with the plug with the slope extending into a throat constriction that may then diametrically increase forming the venturi-like opening.

An additional object of the present invention is to provide the barrel wall with an aperture serving as vent between the barrel throughbore and exterior wall.

Yet another object of the present invention is to provide the barrel interior throughbore with interior threads in the top end portion for threadedly mounting a plug therein.

A further object of the present invention is to provide the plug having a top end with exterior threads and an interior socket receiving a provided driver tool for moving the plug between open and closed venting states.

Another object of the present invention is to provide the plug with a shaft portion wherein the body diametrically decrease in cross-section forming a plug body step down with the shaft also having circumferential channels receiving gaskets that by virtue of the step down prevents contact between the gaskets and the barrel's interior threads.

It is, yet, another object of the present invention is to provide the plug with a bottom end diametrically decreasing in a predetermined angular slope corresponding to the degree of slope of the barrel's interior slope thereby forming the metal-to-metal valve seat.

Another object of the present invention is to provide the plug terminating in a tapered shaft correspondingly sized to the barrel's venture-like throat constriction intended to help keep opening free of debris and minimize plugging.

It is an additional object of the present invention is to provide a safety release bleeder valve serving as a plug that provides a method for releasing the pressure that may have built up behind the plug in a controlled manner.

Another object of the present invention is to provide a safety release bleeder valve having an optional plug fastener serving as lock nut to prevent casual displacement of the plug barrel latching.

Yet another object of the present invention is to provide a method for releasing the pressure that may have built up behind the plug in a controlled manner comprising a black oxide bleeder valve fabricated with a vent hole for controlled pressure release.

Additional objects of the present invention will appear as the description proceeds.

The present invention overcomes the shortcomings of the prior art by providing a safety device, serving as a plug and also providing a method for releasing the pressure that may have built up behind the plug in a controlled manner. The device comprising a black oxide plug fabricated with a vent hole for controlled pressure release.

More particularly, the present invention provides a safety release bleeder valve serving as a plug, which includes a barrel having an exterior surface and an interior throughbore surface for matingly receiving a plug having a top end with exterior threads and an interior socket receiving a provided driver tool for moving the plug between an open venting state and a closed non-venting states.

Preferably, the barrel has a top end and a bottom end with the top end having a polygonal shape to receive a tool for applying torque during installation and removal of the safety release bleeder valve. It is also preferable that the bottom end include exterior tapered threads for sealingly mounting the barrel to a pressurized vessel/pipe.

It is further preferable that the bottom end interior of the barrel have a venturi constriction comprising a throughbore wall diametrically decreasing forming a mating valve seat member with the plug with the slope extending into a throat constriction that may then diametrically increase forming a venturi opening.

Preferably, the plug includes a shaft portion that diametrically decrease in cross-section forming a plug body step down with the shaft having circumferential channels receiving gaskets that by virtue of the step down prevents contact between the gaskets and the barrel's interior threads.

Preferably, the plug with a bottom end diametrically decreasing in a predetermined angular slope corresponding to the degree of slope of the barrel's interior slope thereby forming the metal-to-metal valve seat.

Preferably, the safety release bleeder value includes means for releasing pressure that may have built up behind the plug in a controlled manner comprising a black oxide bleeder valve fabricated with a vent hole for the controlled pressure release.

It is desirable to provide a valve comprising a barrel portion having external threads mateable to a pressure vessel/pipe having a correspondingly threaded aperture therein and internal threads for mounting a correspondingly threaded plug movable between an open venting state and a closed non-venting state.

It is further desirable to provide the bleeder valve with a metal-to-metal valve seat wherein the barrel provides a first mating metal seat member and with the plug having the second mating metal seat member.

Other objects and features of the present invention will become apparent when considered in combination with the accompanying drawing figures, which illustrate certain preferred embodiment of the present invention. It should, however, be noted that the accompanying drawing figures are intended to illustrate only select preferred embodiments of the claimed invention and are not intended as a means for defining the limits and scope of the invention.

BRIEF DESCRIPTION OF THE DRAWING FIGURES

In the drawing figures, wherein similar features are denoted with similar reference numerals throughout the several views.

DESCRIPTION OF THE REFERENCED NUMERALS

Figure 1:
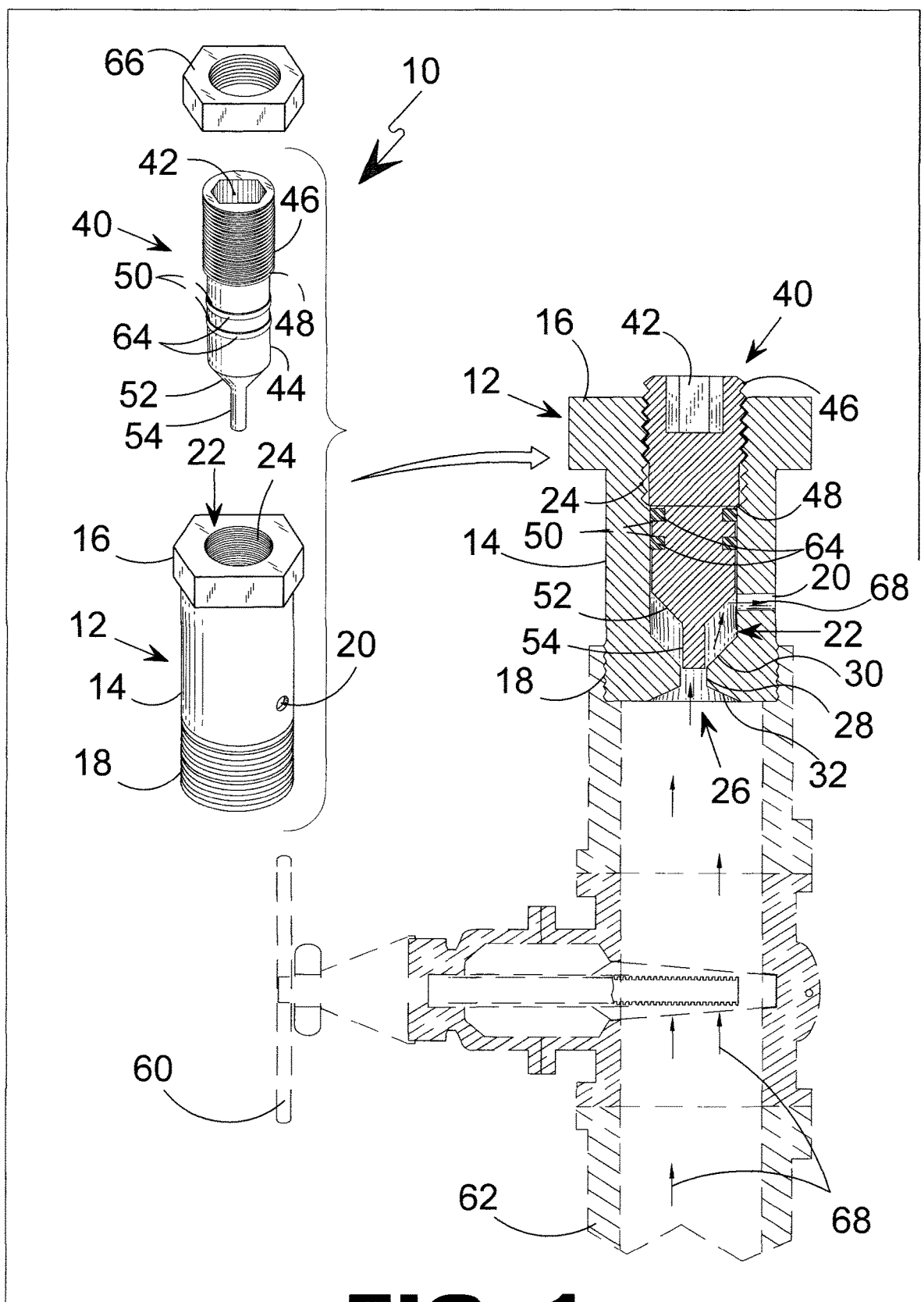
FIG. 1 is an overview of the safety plug of the present invention in use having a plug and barrel incorporating a 45° seat.

Turning now descriptively to the drawings, in which similar reference characters denote similar elements throughout the several views, the figures illustrate the use of the present invention. With regard to the reference numerals used, the following numbering is used throughout the various drawing figures:

10 safety release bleeder valve
12 barrel
14 barrel exterior wall
16 barrel exterior head
18 barrel exterior tapered threads
20 barrel vent aperture
22 barrel throughbore
24 threads of barrel throughbore
26 venturi barrel constrictions
28 venturi throat constriction
30 interior slope of venture-like constriction
32 exterior slope of venture-like constriction
40 plug
42 plug interior cavity
44 plug exterior surface
46 plug exterior threads
48 plug body stepdown
50 plug body circumferential gasket channels
52 plug body valve seat slope
54 plug body tapered shaft
56 45° slope
58 22° slope
60 block valve
62 pressure vessel/pipe
64 gasket
66 fastener
68 fluid

DETAILED DESCRIPTION OF THE DRAWING FIGURES AND PREFERRED EMBODIMENTS

The invention will now be described, by way of example only, with reference to the accompanying drawings:

FIG. 1 is an overview an enablement of a 45° metal-to-metal bleeder valve in an open state mounted on a pressure vessel/pipe. The present invention is a bleeder valve 10 used downstream from a block valve 60 in an internally pressurized fluid carrying pipe 62 to release fluid 68 in a controlled manner that may built up behind valve 10. The bleeder valve 10 is comprised of barrel 12 and plug 40 each having a portion of a mating metal to metal vent/shut-off providing the user the ability to slowly vent the space between the closed block valve and the plugged/capped or blinded open ended line, depressurizing the area in a controlled manner.

Cylindrical barrel 12 has an exterior wall 14 with threads 18 on the bottom portion and a polygonal shaped top end 16 for attachment of a user provided driver tool in mounting and dismounting valve 10 via threads 18 from pressure vessel/pipe 62 having a threaded aperture therein. Barrel 12 has throughbore 22 with conduit 20 extending from throughbore 22 through exterior wall 14 serving as vent for any fluid 68 within the space between the closed block valve 60 and bleeder valve 10 so that when plug 40 is in an open state, as illustrated, fluid 68 can be controllably released. Barrel throughbore 22 further provides threaded top end 24 and venturi-like bottom end 26 comprising a conically decreasing slope 30 leading to throat constriction 28 and then to an increasing ingress slope 32. The degree of barrel slope 30 (in this embodiment 45°) (see FIG. 2) is equivalent to the degree of valve seat slope 52 of plug 40 each forming the required metal-to-metal shut-off for gas and liquid hydrocarbon and chemical services. Plug 40 has a top end socket 42 for attachment of a user provided driver tool, such as hex or allen wrench, for selectively moving barrel 12 seated plug 40 from a closed to open state and from an open to closed state.

Plug 40 exterior surface 44 has threads 46 about the top end with the plug body then stepping down 48 in cross-sectional area with a pair of circumferential gasket channels 50 and again decreasing in cross-sectional area through slope 52 (the plug portion of the metal-to-metal valve seat) to tapered shaft 54. Tapered shaft 54 is correspondingly sized to barrel throat constriction 28 to prevent fouling of the opening. Also shown are gaskets 64 and optional fastener 66 that may be used as a lock nut for plug 40 when mated to barrel 12 (see, FIG. 3A).

Figure 1A:
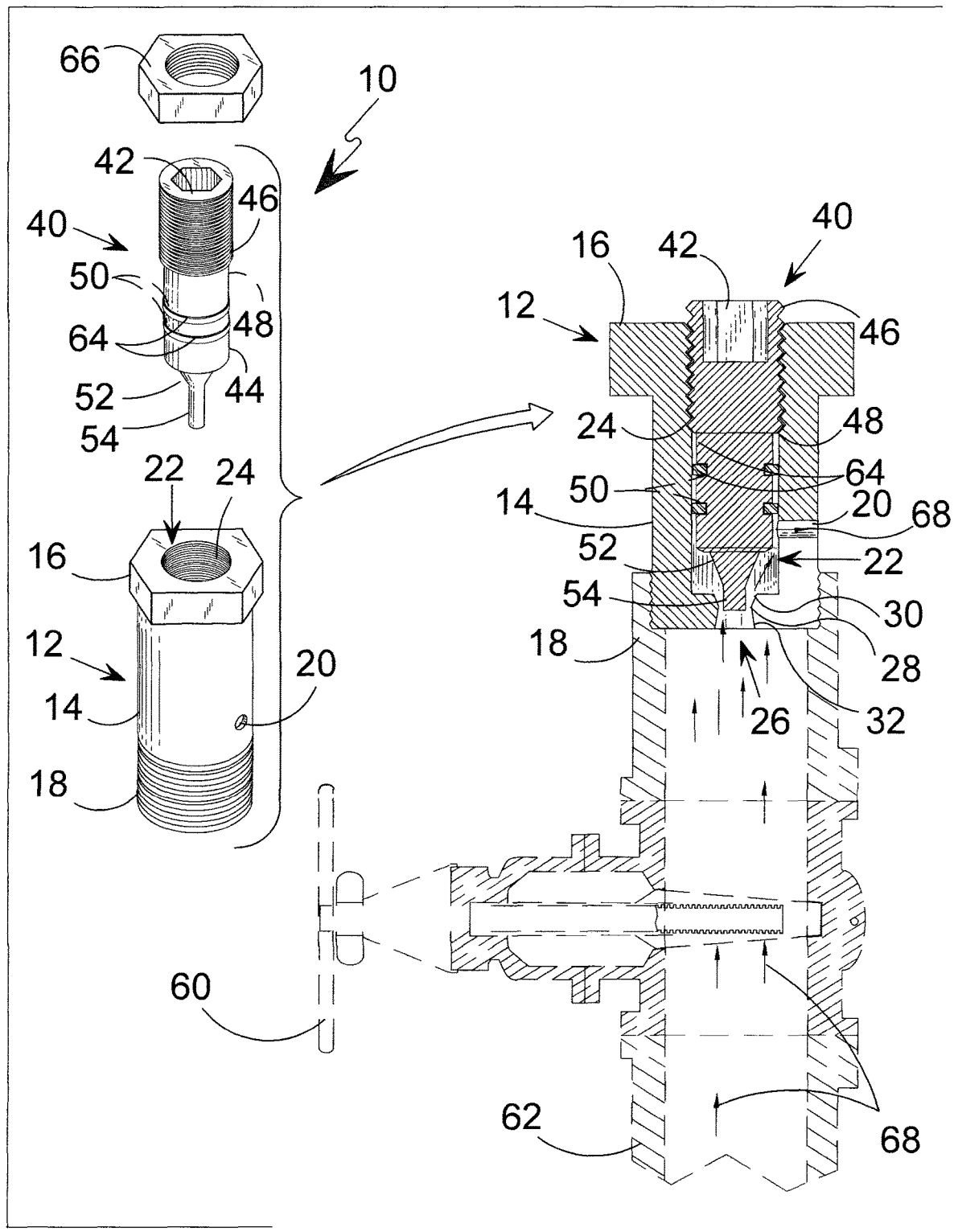
FIG. 1A is an overview of the safety plug of the present invention in use having a plug and barrel incorporating a 22° seat.

FIG. 1A is an overview an enablement of a 22° metal-to-metal bleeder valve in an open state mounted on a pressure vessel/pipe. Barrel 12 and plug 40 form a mating metal to metal vent/shut-off valve to depressurize the space between the plugged/capped or blinded open ended line and a closed block valve with threads 18 enabling attachment to a pressure vessel/pipe 62 having a threaded aperture.

Conduit 20 extends between throughbore 22 and exterior wall 14 as vent for any fluid 68 within the space between the closed block valve 60 and bleeder valve 10 so that when plug 40 is moved to an open state, as illustrated, fluid 68 is controllably released.

Interior throughbore 22 has a threaded top end and venturi-like bottom end 26 that decrease conically through slope 30 to throat constriction 28. The degree of barrel slope 30 (in this embodiment 22°) is equivalent to the degree of valve seat slope 52 of plug 40 each forming the required metal-to-metal shut-off for gas and liquid hydrocarbon and chemical services.

Figure 2:
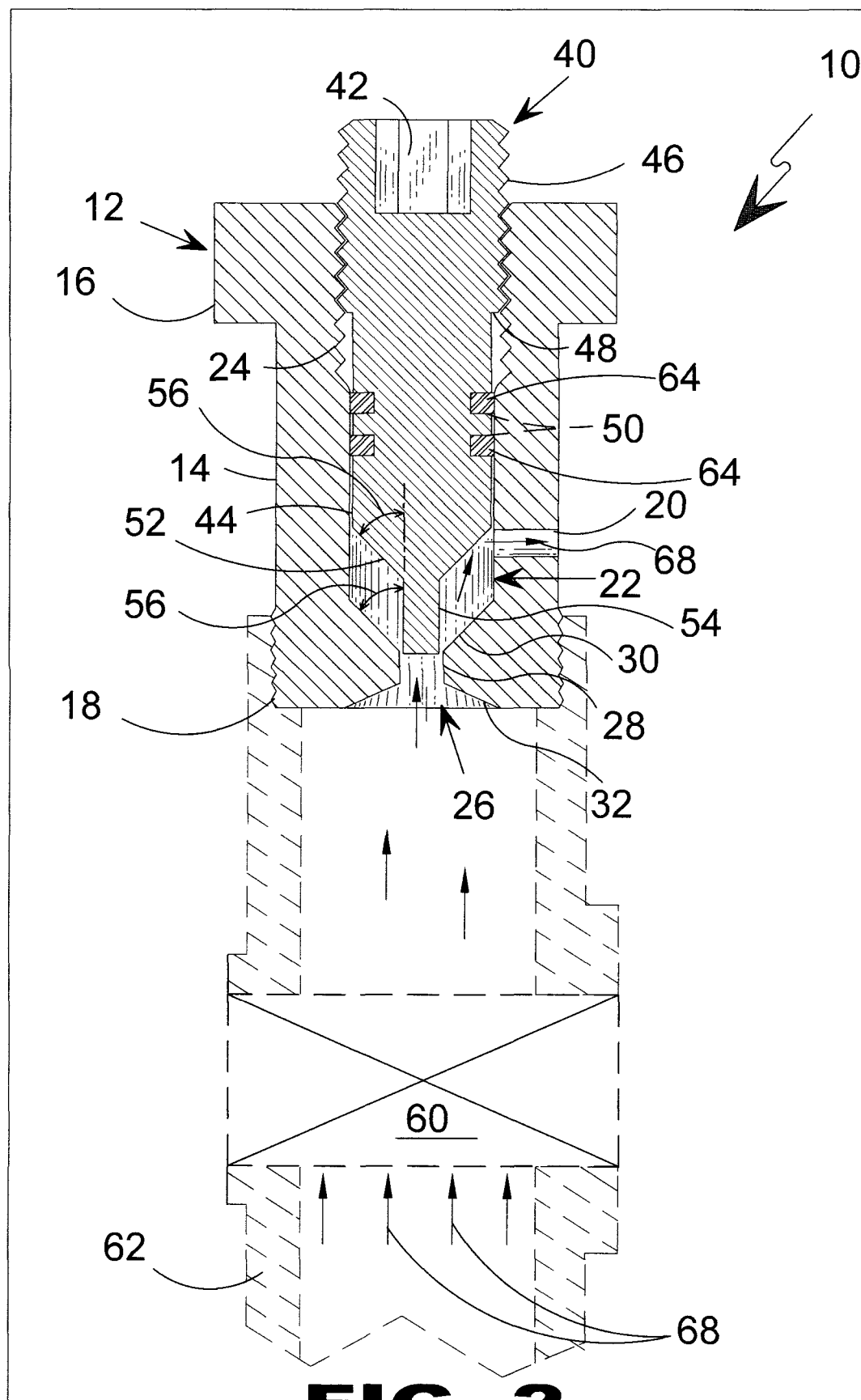
FIG. 2 is a cross-sectional view of the plug and barrel having a 45° seat in a venting open state.

FIG. 2 is an cross-sectional view an enablement of a 45° metal-to-metal bleeder valve in an open state mounted on a pressure vessel/pipe. The bleeder valve 10 is used downstream from a block valve 60 in an internally pressurized fluid carrying pipe 62 to release fluid 68 in a controlled manner that may built up behind closed block valve 60 and bleeder valve 10. The exterior wall 14 of barrel 12 has threads 18 on the bottom portion and a shaped end 16 for attachment of a provided driver tool in mounting and dismounting valve 10 via threads 18 from pressure vessel/pipe 62. Throughbore 22 of barrel 12 provides vent 20 in fluid communication with the ambient environment when plug 40 is in an open state. Throughbore 22 has a venturi-like bottom end 26 comprising a conically decreasing slope 30 leading to throat constriction 28 and then to an increasing ingress slope 32. The degree of barrel slope 30 (in this enablement 45°) is equivalent to the degree of valve seat slope 52 of plug 40 each forming the required metal-to-metal shut-off for gas and liquid hydrocarbon and chemical services.

Top end socket 42 of plug 40 allows use of a provided driver tool for selectively moving barrel seated plug 40 from a closed to open state and from an open to closed state. Plug 40 exterior surface 44 has threads 46 about the top end with the plug body then diametrically decreasing in cross-sectional area 48 with a pair of circumferential gasket channels 50 housing gaskets 64 with the diametric step down 48 designed to mitigate contact between gaskets 64 and barrel threads 24 while inserting and removing plug 40 from barrel 12. Slope 52 of Plug 40 forms the plug portion of the metal-to-metal valve seat with slope 30 of barrel 12 forming the corresponding barrel portion depicted in this preferred embodiment with a 45° slope 56. Plug tapered shaft 54 is correspondingly sized to the barrel throat constriction 28 to prevent fouling of the opening.

Figure 2A:
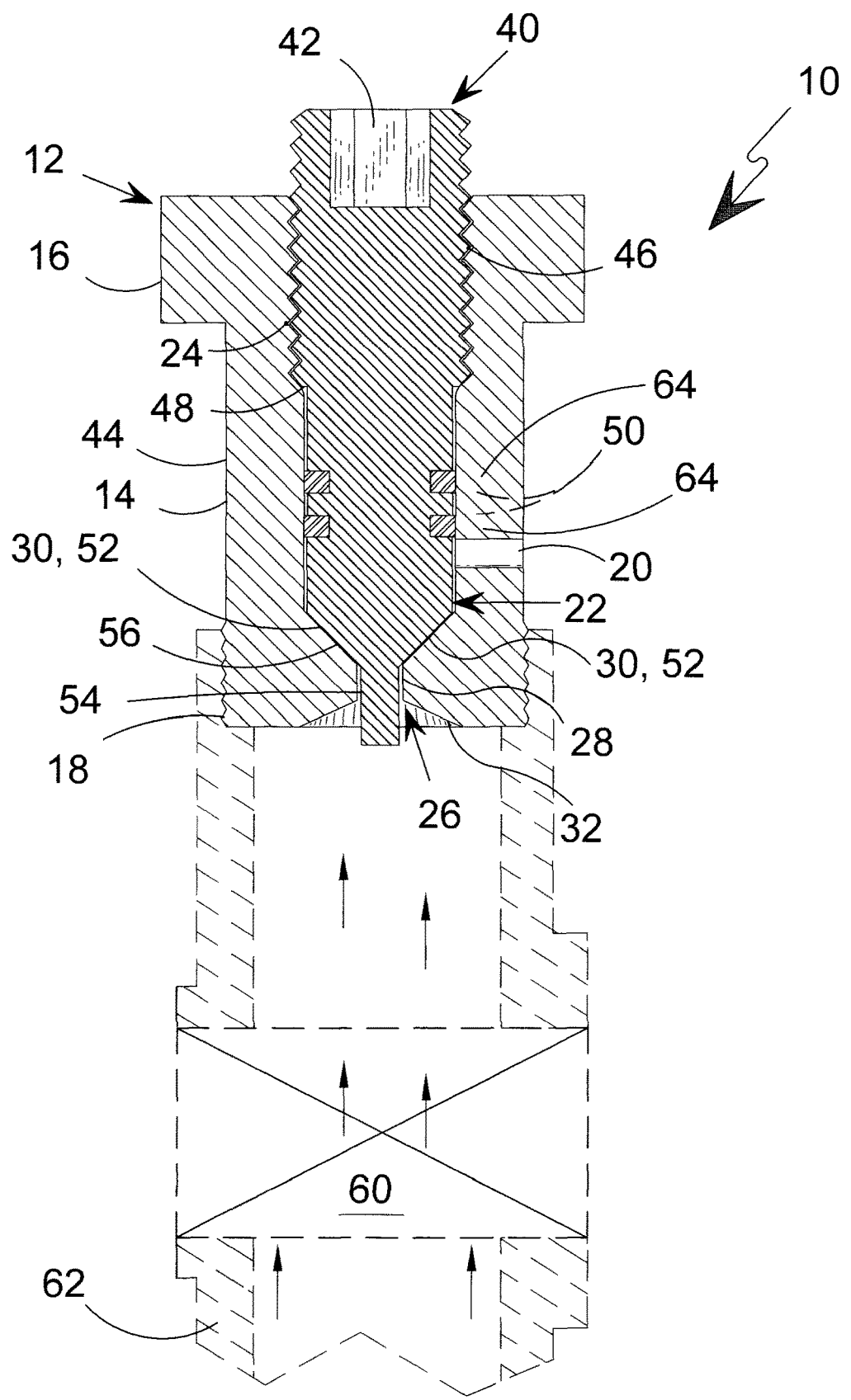
FIG. 2A is a cross-sectional view of the plug and barrel having a 45° seat in a closed non-venting state.

FIG. 2A is a cutaway view of an enablement of a 45° metal-to-metal bleeder valve in a non-venting state mounted on a pressure vessel/pipe. The bleeder valve 10 is used downstream from a block valve 60 in an internally pressurized fluid carrying pipe 62 to release fluid 68 in a controlled manner that may built up behind closed block valve 60 and bleeder valve 10. The exterior wall 14 of barrel 12 has threads 18 on the bottom portion and a shaped end 16 for attachment of a provided driver tool in mounting and dismounting valve 10 via threads 18 from pressure vessel/pipe 62. Throughbore 22 of barrel 12 provides vent 20 in fluid communication with the ambient environment when plug 40 is in an open state.

Throughbore 22 has a venturi bottom end 26 comprising a conically decreasing slope 30 leading to throat constriction 28 and then to an increasing ingress slope 32. The degree of barrel slope 30 (in this enablement 45°) is equivalent to the degree of valve seat slope 52 of plug 40 each forming the required metal-to-metal shut-off for gas and liquid hydrocarbon and chemical services. Top end socket 42 of plug 40 allows use of a provided driver tool for selectively moving barrel seated plug 40 from a closed to open state and from an open to closed state. Plug 40 exterior surface 44 has threads 46 about the top end with the plug body then diametrically decreasing in cross-sectional area 48 with a pair of circumferential gasket channels 50 housing gaskets 64 with the diametric step down 48 designed to mitigate contact between gaskets 64 and barrel threads 24 while inserting and removing plug 40 from barrel 12. Slope 52 of Plug 40 forms the plug portion of the metal-to-metal valve seat with slope 30 of barrel 12 forming the corresponding barrel portion depicted in this embodiment with a 45° slope 56. Plug tapered shaft 54 is correspondingly sized to the barrel throat constriction 28 to prevent fouling of the opening.

Figure 3:
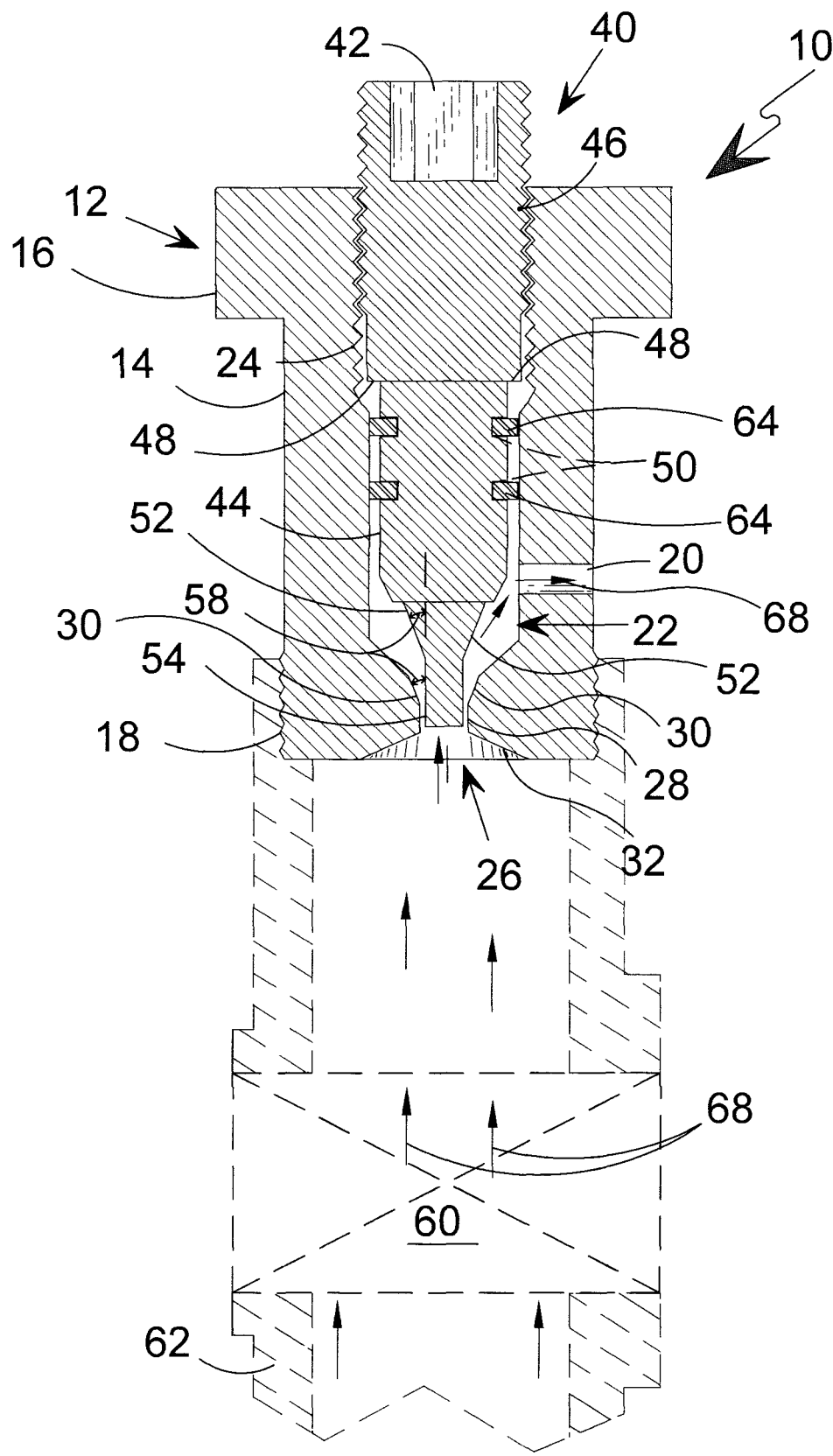
FIG. 3 is a cross-sectional view of the plug and barrel having a 22° seat in a venting open state.

FIG. 3 is a cutaway view of an enablement of a 22° metal-to-metal bleeder valve in an open state mounted on a pressure vessel/pipe. The exterior wall 14 of barrel 12 has threads 18 on the bottom portion and a shaped end 16 for attachment of a provided driver tool in mounting and dismounting valve 10 via threads 18 from pressure vessel/pipe 62. Throughbore 22 of barrel 12 provides vent 20 in fluid communication with the ambient environment when plug 40 is in an open state. Throughbore 22 has a venturi-like bottom end 26 comprising a conically decreasing slope 30 leading to throat constriction 28 and then to an increasing ingress slope 32. The degree of barrel slope 30 (in this preferred embodiment 22°) is equivalent to the degree of valve seat slope 52 of plug 40 each forming the required metal-to-metal shut-off for gas and liquid hydrocarbon and chemical services.

Top end socket 42 of plug 40 allows use of a provided driver tool for selectively moving barrel seated plug 40 from a closed to open state and from an open to closed state. Plug 40 exterior surface 44 has threads 46 about the top end with the plug body then diametrically decreasing in cross-sectional area 48 with a pair of circumferential gasket channels 50 housing gaskets 64 with the diametric step down 48 designed to mitigate contact between gaskets 64 and barrel threads 24 while inserting and removing plug 40 from barrel 12. Slope 52 of Plug 40 forms the plug portion of the metal-to-metal valve seat with slope 30 of barrel 12 forming the corresponding barrel portion depicted in this preferred embodiment with a 22° slope 58. Plug tapered shaft 54 is correspondingly sized to the barrel throat constriction 28 to prevent fouling of the opening.

Figure 3A:
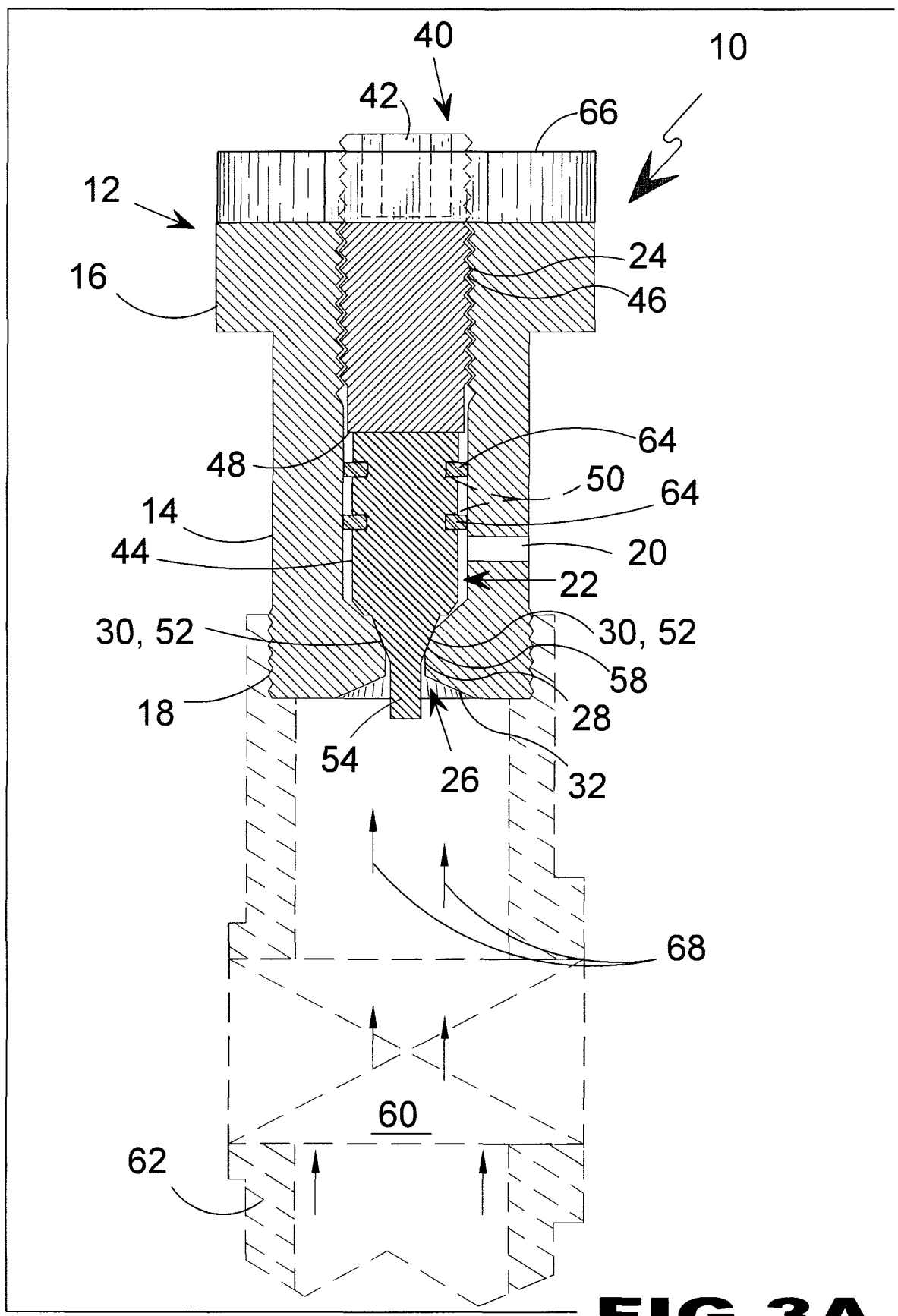
FIG. 3A is a cross-sectional view of the plug and barrel having a 22° seat in a closed non-venting state.

FIG. 3A is a cutaway view of an enablement of a 22° metal-to-metal bleeder valve in a non-venting state mounted on a pressure vessel/pipe. The exterior wall 14 of barrel 12 has threads 18 on the bottom portion and a shaped end 16 for attachment of a provided driver tool in mounting and dismounting 12 via threads 18 from pressure vessel/pipe 62.

Throughbore 22 of barrel 12 provides vent 20 in fluid communication with the ambient environment when plug 40 is in an open state. Throughbore 22 has a venturi-like bottom end 26 comprising a conically decreasing slope 30 leading to throat constriction 28 and then to an increasing ingress slope 32. The degree of barrel slope 30 (in this preferred embodiment 22°) is equivalent to the degree of valve seat slope 52 of plug 40 each forming the required metal-to-metal shut-off for gas and liquid hydrocarbon and chemical services.

Top end socket 42 of plug 40 allows use of a provided driver tool for selectively moving barrel seated plug 40 from a closed to open state and from an open to closed state. Plug 40 exterior surface 44 has threads 46 about the top end with the plug body then diametrically decreasing in cross-sectional area 48 with a pair of circumferential gasket channels 50 housing gaskets 64 with the diametric step down 48 designed to mitigate contact between gaskets 64 and barrel threads 24 while inserting and removing plug 40 from barrel 12. Slope 52 of Plug 40 forms the plug portion of the metal-to-metal valve seat with slope 30 of barrel 12 forming the corresponding barrel portion depicted in this embodiment with a 220 slope 58. Plug tapered shaft 54 is correspondingly sized to the barrel throat constriction 28 to prevent fouling of the opening.

Figure 4:
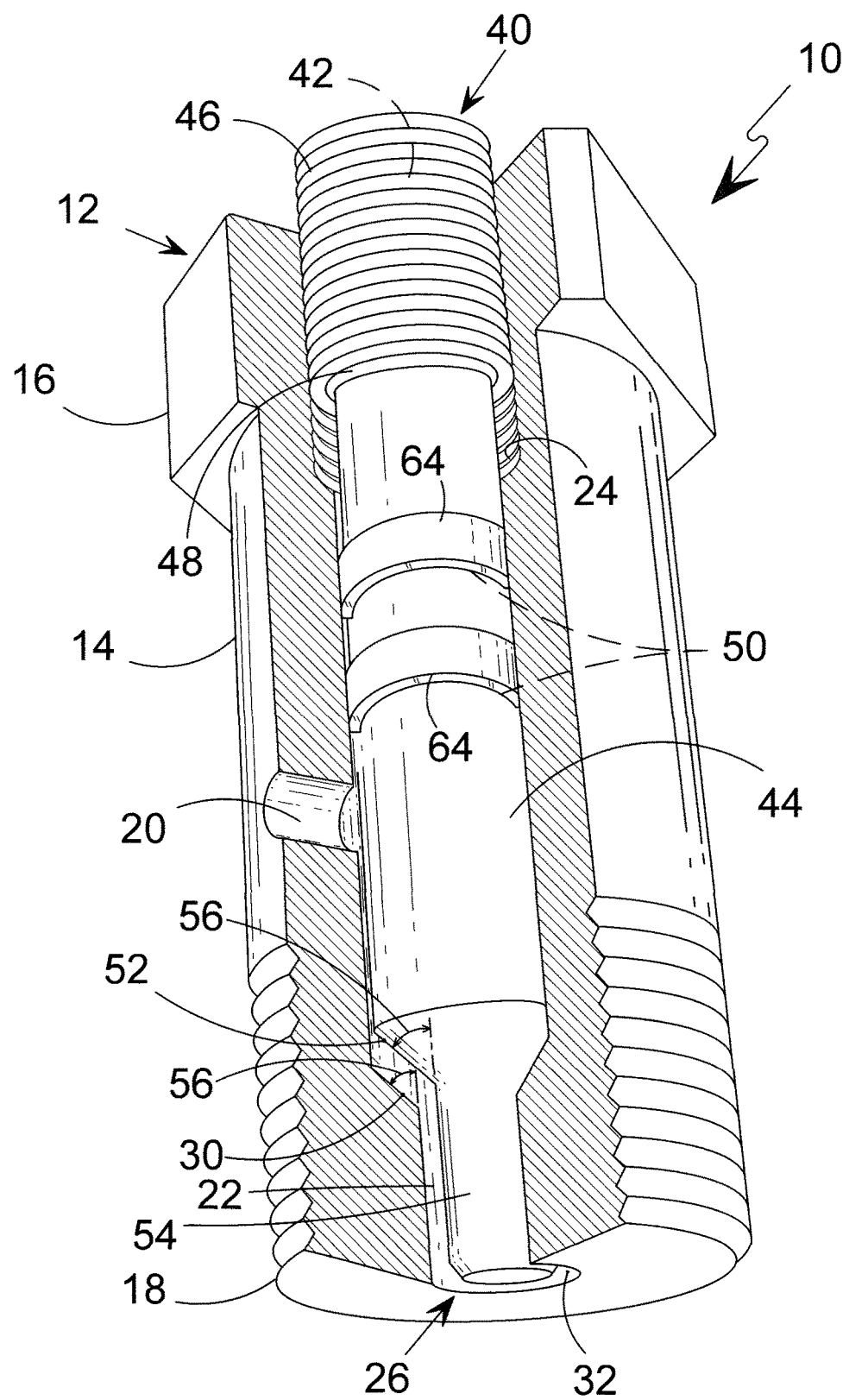
FIG. 4 is a cutaway view of the plug and barrel having a 45° seat in a venting open state.

FIG. 4 is a cutaway view an enablement of a 45° metal-to-metal bleeder valve in an open state mounted on a pressure vessel/pipe. The present invention is a bleeder valve 10 used downstream from a block valve 60 (see FIG. 2) in an internally pressurized fluid carrying pipe 62 to release fluid 68 in a controlled manner that may built up behind valve 10. The bleeder valve 10 is comprised of barrel 12 and plug 40 each having a portion of a mating metal to metal vent/shut-off providing the user the ability to slowly vent the space between the closed block valve and the plugged/capped or blinded open ended line, depressurizing the area in a controlled manner.

Cylindrical barrel 12 has an exterior wall 14 with threads 18 on the bottom portion and a polygonal shaped top end 16 for attachment of a user provided driver tool in mounting and dismounting valve 10 via threads 18 from pressure vessel/pipe 62 having a threaded aperture therein. Barrel 12 has throughbore 22 with conduit 20 extending from throughbore 22 through exterior wall 14 serving as vent for any fluid 68 within the space between the closed block valve 60 and bleeder valve 10 so that when plug 40 is in an open state, as illustrated, fluid 68 can be controllably released.

Barrel throughbore 22 further provides threaded top end 24 and venturi-like bottom end 26 comprising a conically decreasing slope 30 leading to throat constriction 28 and then to an increasing ingress slope 32. The degree of barrel slope 30 (in this enablement 45°) is equivalent to the degree of valve seat slope 52 of plug 40 each forming the required metal-to-metal shut-off for gas and liquid hydrocarbon and chemical services. Plug 40 has a top end socket 42 for attachment of a user provided driver tool, such as hex or allen wrench, for selectively moving barrel 12 seated plug 40 from a closed to open state and from an open to closed state.

Plug 40 exterior surface 44 has threads 46 about the top end with the plug body then stepping down 48 in cross-sectional area with a pair of circumferential gasket channels 50 and again decreasing in cross-sectional area through slope 52 (the plug portion of the metal-to-metal valve seat) to tapered shaft 54. Tapered shaft 54 is correspondingly sized to barrel throat constriction 28 to prevent fouling of the opening. Also provided are gaskets 64 and optional fastener 66 (see, FIG. 3A) that may be used as a lock nut for plug 40 when mated to barrel 12.

Figure 4A:
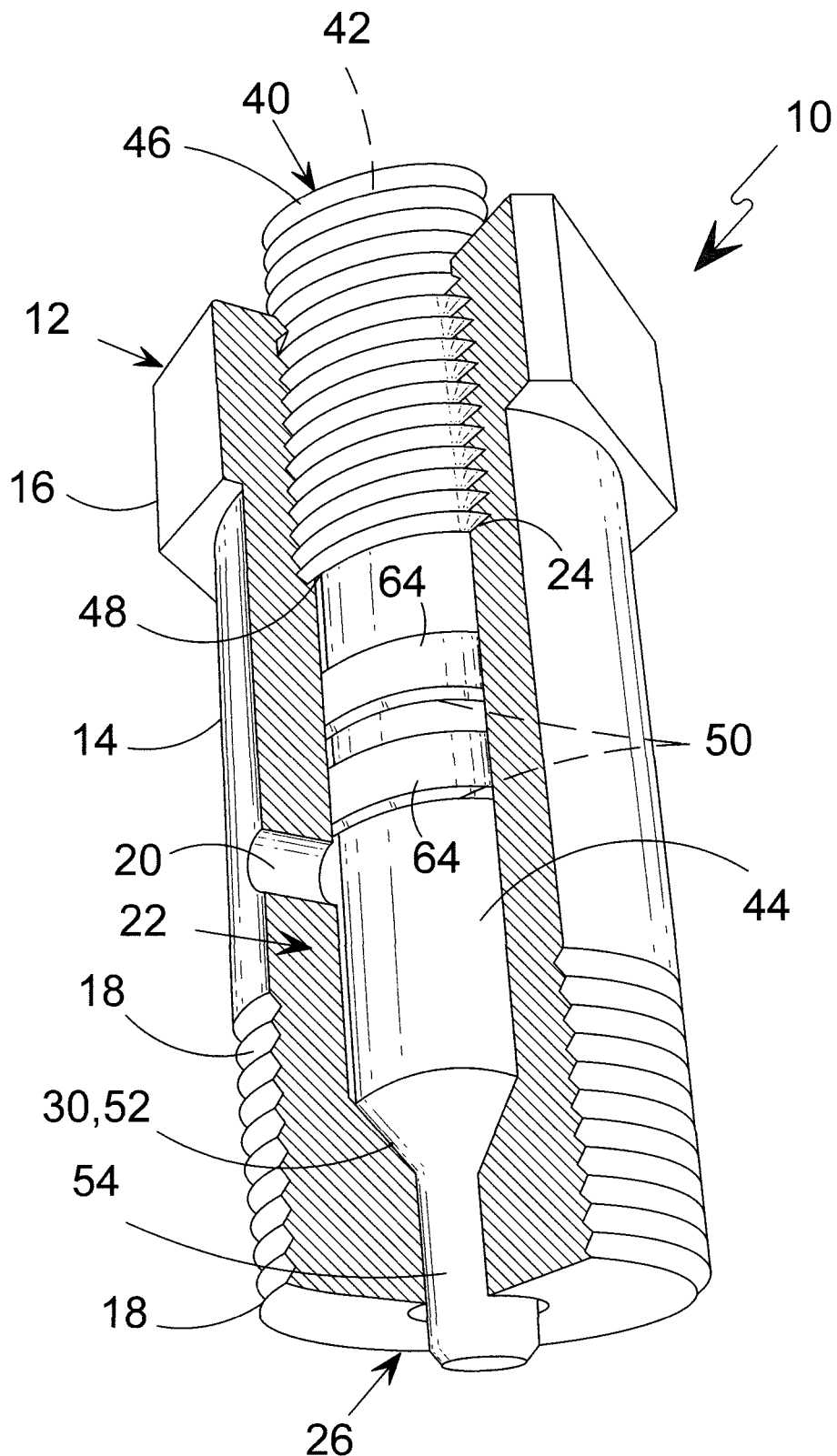
FIG. 4A is a cutaway view of the plug and barrel having a 45° seat in a closed non-venting state.

FIG. 4A is a cutaway view an enablement of a 45° metal-to-metal bleeder valve in a closed non-venting state mounted on a pressure vessel/pipe. The present invention is a bleeder valve 10 used downstream from a block valve 60 (see FIG. 2A) in an internally pressurized fluid carrying pipe 62 to release fluid 68 in a controlled manner that may built up behind valve 10. The bleeder valve 10 is comprised of barrel 12 and plug 40 each having a portion of a mating metal to metal vent/shut-off providing the user the ability to slowly vent the space between the closed block valve and the plugged/capped or blinded open ended line, depressurizing the area in a controlled manner. Cylindrical barrel 12 has an exterior wall 14 with threads 18 on the bottom portion and a polygonal shaped top end 16 for attachment of a user provided driver tool in mounting and dismounting valve 10 via threads 18 from pressure vessel/pipe 62 having a threaded aperture therein.

Barrel 12 has throughbore 22 with conduit 20 extending from throughbore 22 through exterior wall 14 serving as vent for any fluid 68 within the space between the closed block valve 60 and bleeder valve 10 so that when plug 40 is in an open state fluid 68 can be controllably released. Barrel throughbore 22 further provides threaded top end 24 and venturi bottom end 26 comprising a conically decreasing slope 30 leading to throat constriction 28. The degree of barrel slope 30 (in this preferred embodiment 45°) is equivalent to the degree of valve seat slope 52 of plug 40 each forming the required metal-to-metal shut-off for gas and liquid hydrocarbon and chemical services.

Plug 40 has a top end socket 42 for attachment of a user provided driver tool, such as a hex or Allen wrench, for selectively moving barrel 12 seated plug 40 from a closed to open state and from an open to closed state.

Plug 40 exterior surface 44 has threads 46 about the top end with the plug body then stepping down 48 in cross-sectional area with a pair of circumferential gasket channels 50 and again decreasing in cross-sectional area through slope 52 (the plug portion of the metal-to-metal valve seat) to tapered shaft 54. Tapered shaft 54 is correspondingly sized to barrel throat constriction 28 to prevent fouling of the opening. Also provided are gaskets 64 and optional fastener 66 (see FIG. 3A) that may be used as a lock nut for plug 40 when mated to barrel 12.

Figure 5:
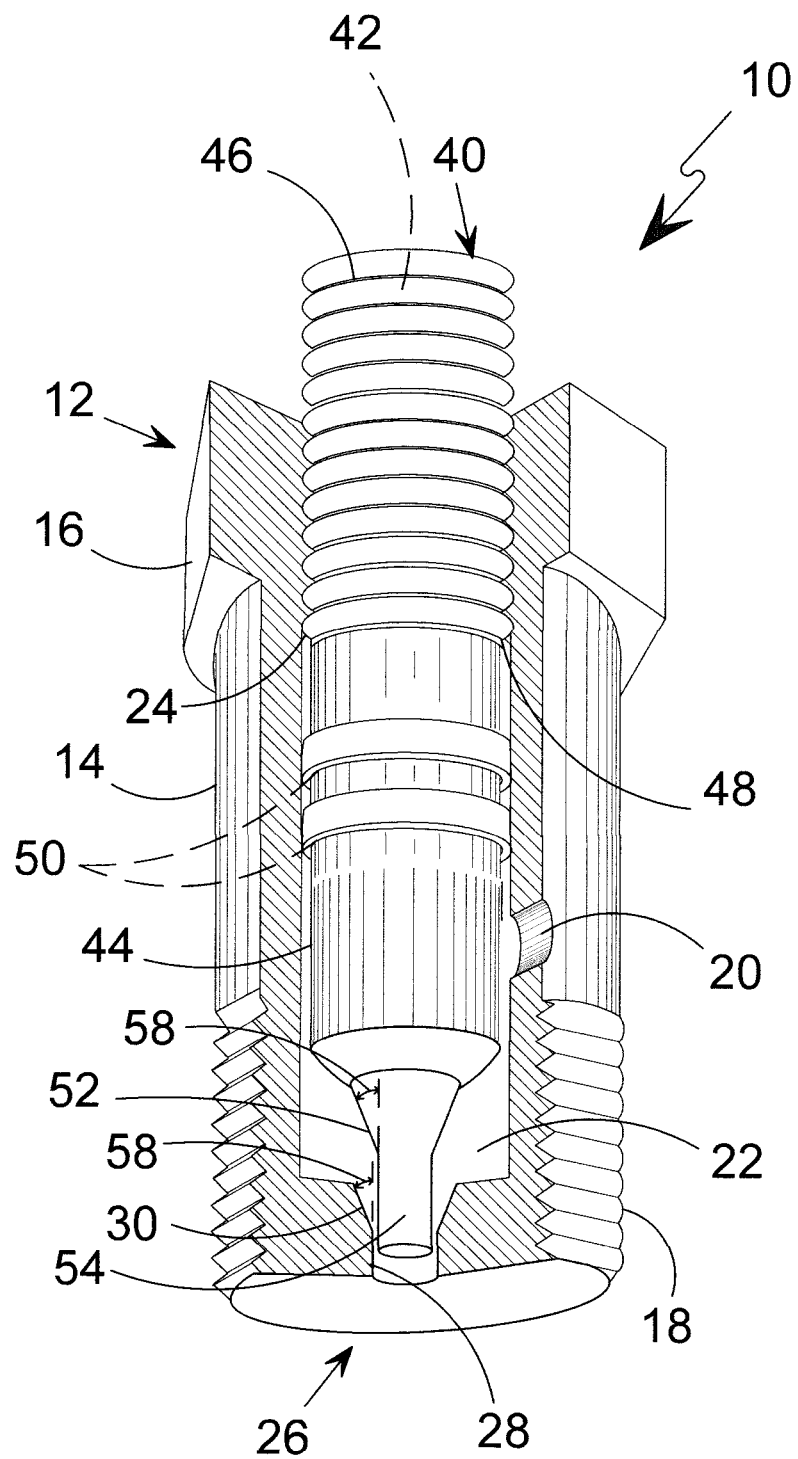
FIG. 5 is a cutaway view of the plug and barrel having a 22° seat in a venting open state.

FIG. 5 is a cutaway view of a preferred embodiment of a 22° metal-to-metal bleeder valve in an open state mounted on a pressure vessel/pipe. The bleeder valve 10 is used downstream from a block valve 60 (see FIG. 3) in an internally pressurized fluid carrying pipe 62 to release fluid 68 in a controlled manner that may built up behind closed block valve 60 and bleeder valve 10. The exterior wall 14 of barrel 12 has threads 18 on the bottom portion and a shaped end 16 for attachment of a provided driver tool in mounting and dismounting valve 10 via threads 18 from pressure vessel/pipe 62. Throughbore 22 of barrel 12 provides vent 20 in fluid communication with the ambient environment when plug 40 is in an open state. Throughbore 22 has a venturi-like bottom end 26 comprising a conically decreasing slope 30 leading to throat constriction 28 and then to an increasing ingress slope 32. The degree of barrel slope 30 (in this enablement 22°) is equivalent to the degree of valve seat slope 52 of plug 40 each forming the required metal-to-metal shut-off for gas and liquid hydrocarbon and chemical services.

Top end socket 42 of plug 40 allows use of a provided driver tool for selectively moving barrel seated plug 40 from a closed to open state and from an open to closed state. Plug 40 exterior surface 44 has threads 46 about the top end with the plug body then diametrically decreasing in cross-sectional area 48 with a pair of circumferential gasket channels 50 housing gaskets 64 with the diametric step down 48 designed to mitigate contact between gaskets 64 and barrel threads 24 while inserting and removing plug 40 from barrel 12. Slope 52 of Plug 40 forms the plug portion of the metal-to-metal valve seat with slope 30 of barrel 12 forming the corresponding barrel portion depicted in this embodiment with a 450 slope 56. Plug tapered shaft 54 is correspondingly sized to the barrel throat constriction 28 to prevent fouling of the opening.

Figure 5A:
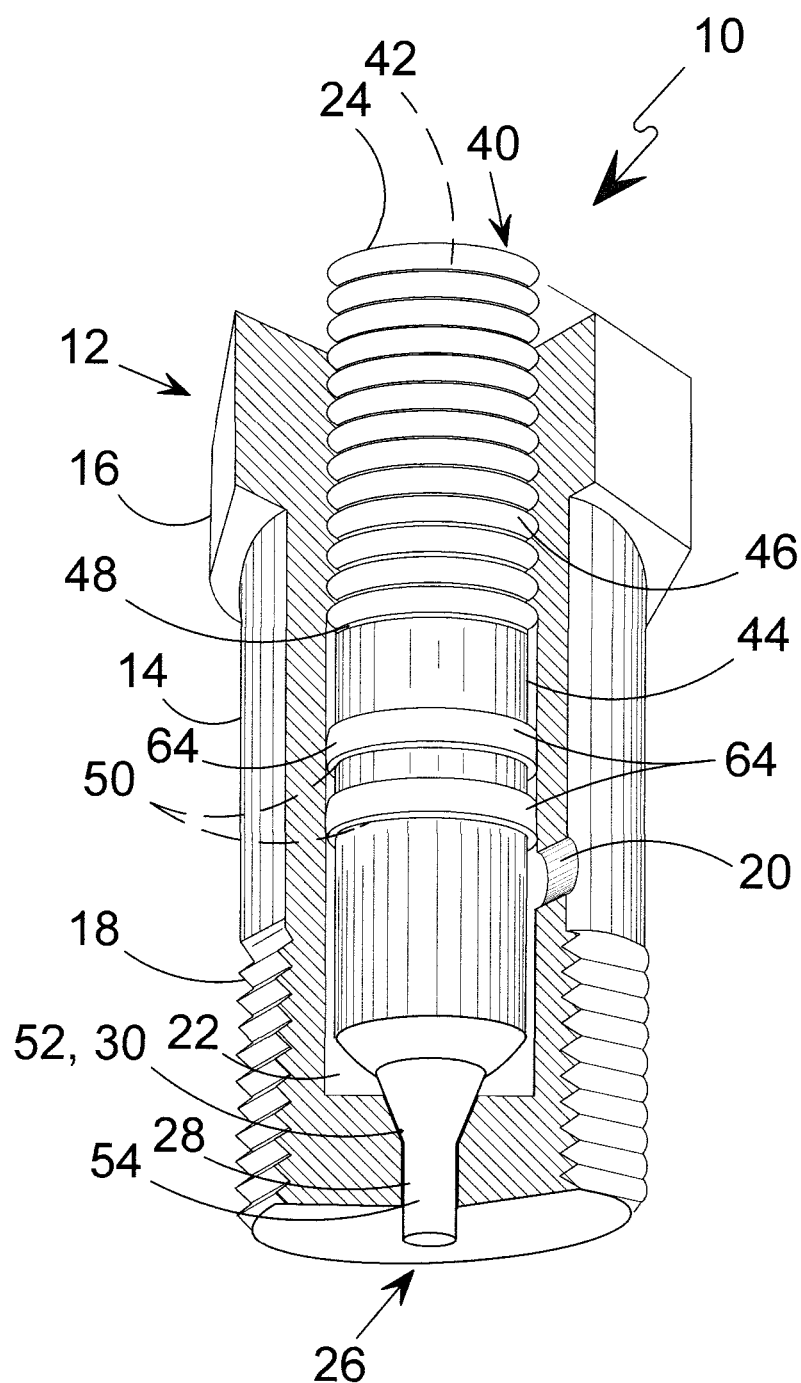
FIG. 5A is a cutaway view of the plug and barrel having a 22° seat in a closed non-venting state.

FIG. 5A is a cutaway view of an enablement of a 22° metal-to-metal bleeder valve in a non-venting state mounted on a pressure vessel/pipe. The bleeder valve 10 is used downstream from a block valve 60 (see FIG. 3A) in an internally pressurized fluid carrying pipe 62 to release fluid 68 in a controlled manner that may built up behind closed block valve 60 and bleeder valve 10. The exterior wall 14 of barrel 12 has threads 18 on the bottom portion and a shaped end 16 for attachment of a provided driver tool in mounting and dismounting valve 10 via threads 18 from pressure vessel/pipe 62. Throughbore 22 of barrel 12 provides vent 20 in fluid communication with the ambient environment when plug 40 is in an open state. Throughbore 22 has a venturi-like bottom end 26 comprising a conically decreasing slope 30 leading to throat constriction 28 and then to an increasing ingress slope 32. The degree of barrel slope 30 (in this preferred embodiment 22°) is equivalent to the degree of valve seat slope 52 of plug 40 each forming the required metal-to-metal shut-off for gas and liquid hydrocarbon and chemical services.

Top end socket 42 of plug 40 allows use of a provided driver tool for selectively moving barrel seated plug 40 from a closed to open state and from an open to closed state. Plug 40 exterior surface 44 has threads 46 about the top end with the plug body then diametrically decreasing in cross-sectional area 48 with a pair of circumferential gasket channels 50 housing gaskets 64 with the diametric step down 48 designed to mitigate contact between gaskets 64 and barrel threads 24 while inserting and removing plug 40 from barrel 12. Slope 52 of Plug 40 forms the plug portion of the metal-to-metal valve seat with slope 30 of barrel 12 forming the corresponding barrel portion depicted in this preferred embodiment with a 450 slope 56. Plug tapered shaft 54 is correspondingly sized to the barrel throat constriction 28 to prevent fouling of the opening.

Figure 6:
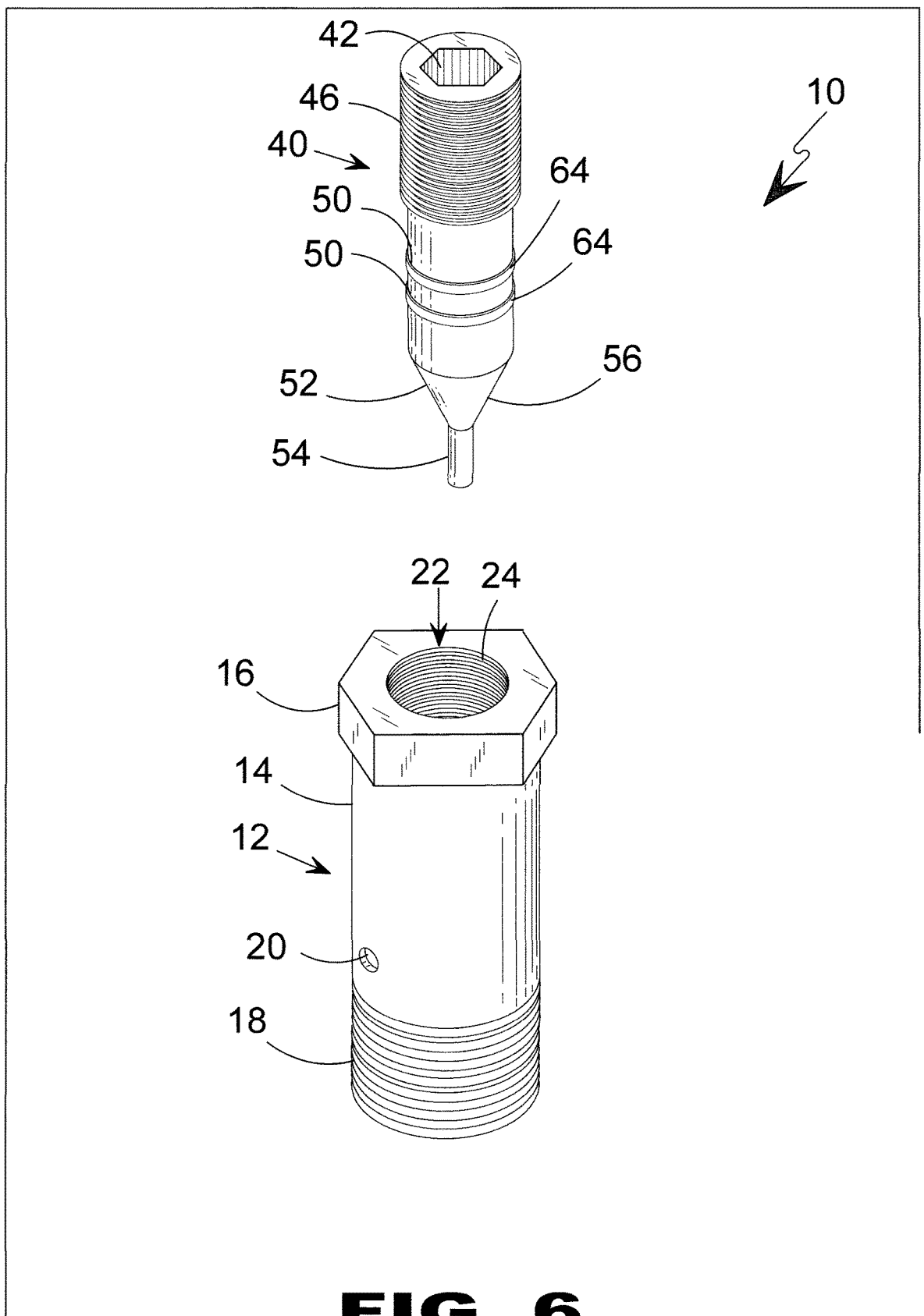
FIG. 6 is an exploded view of the barrel and plug having a 45° seat.

FIG. 6 is an exploded view of the barrel and plug having a 45° seat. Barrel 12 has a polygonal shaped head 16 as attachment for a provided driver tool for threadedly attaching the barrel via threads 18 to a pressure vessel/pipe 62 (see FIG. 2). Exterior wall 14 has aperture 20 in fluid communication with throughbore 22 having threads 24 as latching means for securing plug 40 within barrel 12. A circumferential step down 48 (see FIG. 2) from the threaded portion of plug 40 provides clearance between gaskets 64 in gasket channels 50 and the barrel interior thread 24 (see, FIG. 2.) The bottom end of plug 40 slopes into a corresponding angle 52 as that of the barrel slope 30, thereby forming the metal-to-metal valve seat. Tapered shaft 54 prevents clogging or fouling of barrel venturi throat conscription.

Figure 6A:
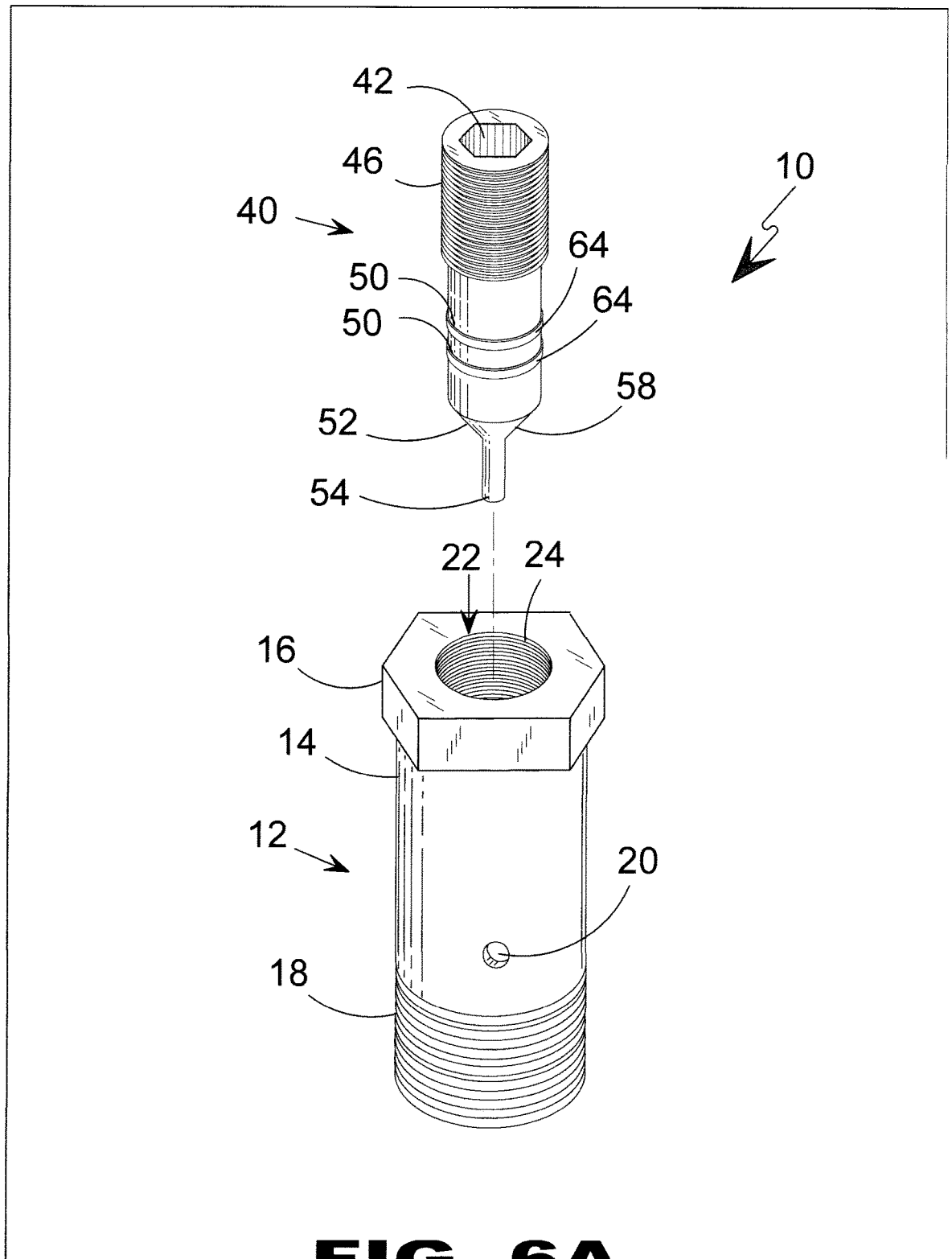
FIG. 6A is an exploded view of the barrel and plug having a 22° seat.

FIG. 6A is an exploded view of the barrel and plug having a 220 seat. Barrel 12 has a cylindrical body 44 extending from a diametrically larger threaded top end 46 having a cavity 42 serving as receptacle for a provided driver tool. A circumferential step down 48 (see, FIG. 5A) from threads 46 provides for gaskets 64 in channels 50 and prevents contact between barrel threads 24 and gaskets 64. The body is further diametrically decreased in forming the plug portion 52 of the metal-to-metal valve seat. The plug bottom end terminates in shaft 54 which is designed to keep the orifice 28 free from debris and clogging.

Figure 7:
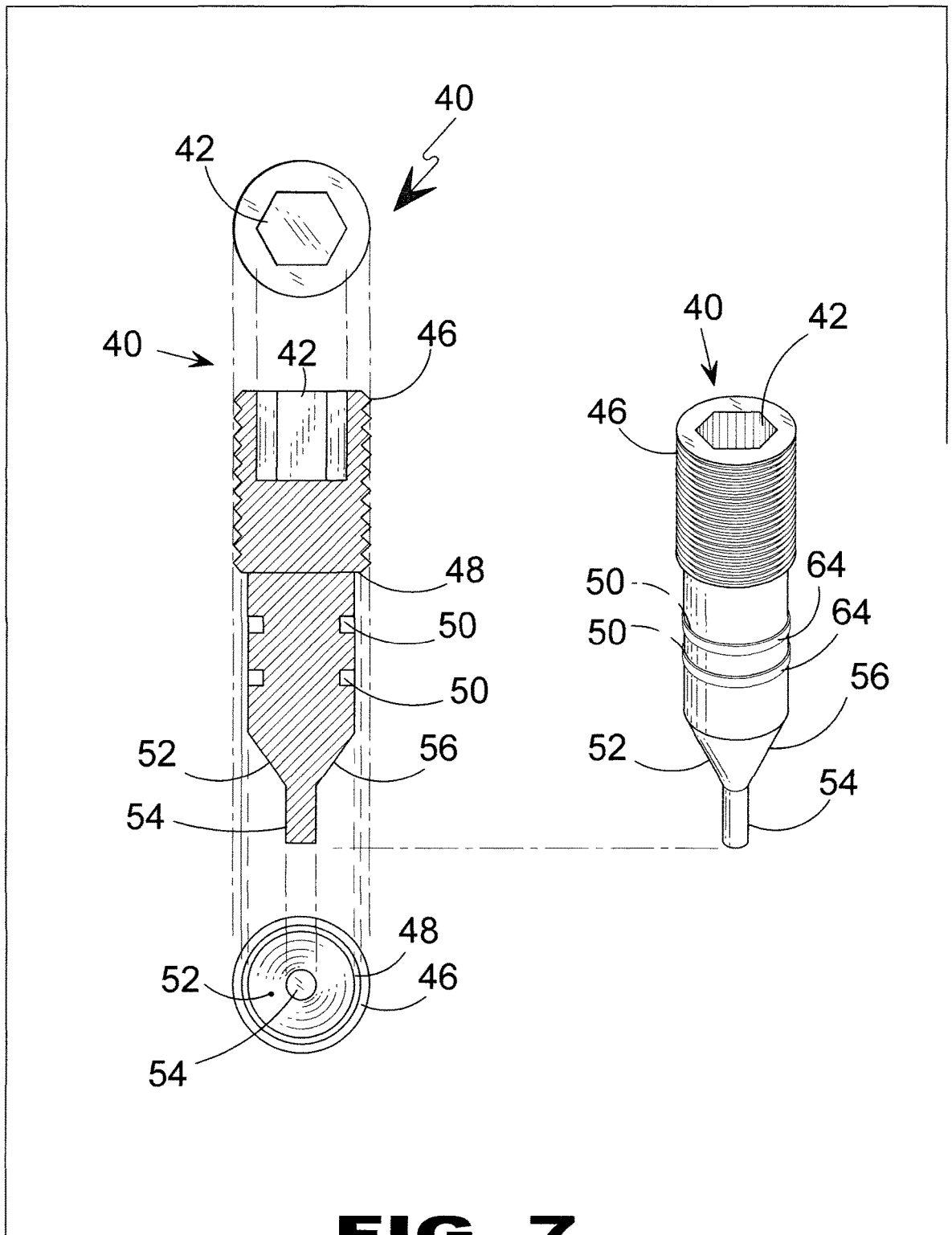
FIG. 7 is a top, bottom and cutaway view of the plug having a 45° seat.

FIG. 7 is a top, bottom and cutaway view of the plug having a 450 seat. Plug 40 top end socket 42 serves as receptacle for a user provided driver tool, such as hex or Allen wrench, while moving seated plug 40 from a closed to open state and from an open to closed state. Plug 40 exterior top end has threads 46 with body 44 then diametrically decreasing forming step down 48 designed to prevent contact between gaskets 64 and barrel threads 24. Also provided in body 44 is at least one channel 50 for at least one gasket 64. Tapered shaft 54 is correspondingly sized to barrel throat constriction 28 to prevent fouling of the opening.

Figure 7A:
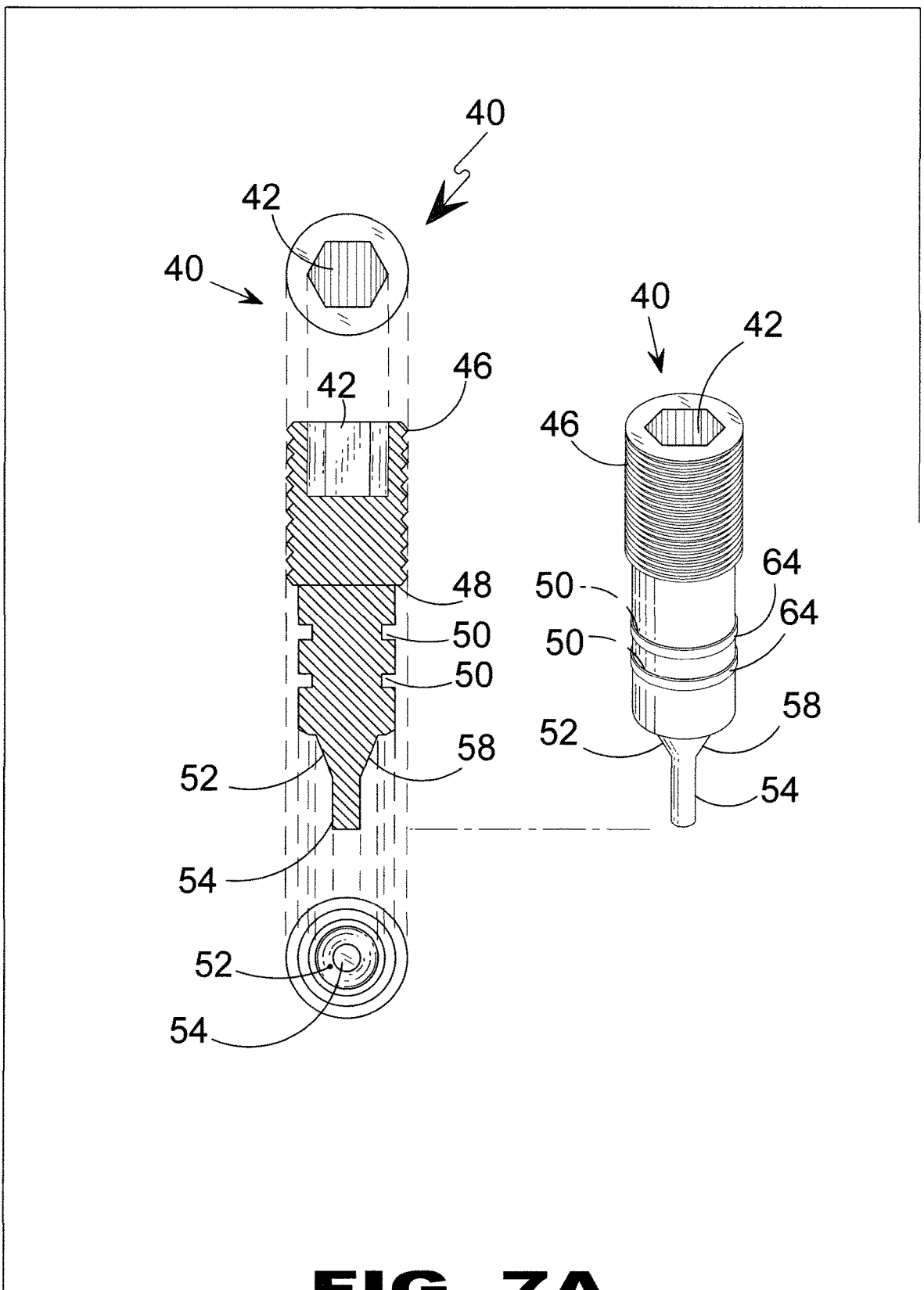
FIG. 7A is top, bottom and cutaway view of the plug having a 22° seat.

FIG. 7A is a top, bottom and cutaway view of the plug having a 22° seat. As aforementioned, plug 40 has a top end socket 42 for attachment of a user provided driver tool, such as hex or Allen wrench, for seating and unseating plug 40 from barrel 12. Slope 52 of Plug 40 forms the plug portion of the metal-to-metal valve seat with slope 30 of barrel 12 forming the corresponding barrel portion depicted in this embodiment with a 22° slope 56. Plug tapered shaft 54 is correspondingly sized to the barrel throat constriction 28 to prevent fouling of the opening.

While only several embodiments of the present invention have been shown and described, it will be obvious to those skilled in the art that many modifications may be made to the present invention without departing from the spirit and scope thereof.

I claim:

1. A safety release bleeder valve comprising:
    a barrel, wherein said barrel comprises an exterior surface, an interior throughbore, a top end, a bottom end and an aperture;
    a plug threadedly mounted into a top end of said interior throughbore of said barrel, wherein said plug comprises:
    a top end with exterior threads and an interior socket;
    a shaft portion with a body diametrically decreasing in cross-section for forming a plug body step down; and
    a bottom end diametrically decreasing in a predetermined angular slope corresponding to a degree of slope of an interior slope of said barrel for forming a valve seat,
    wherein said bottom end of said barrel comprises an interior having a venturi throat constriction comprising a throughbore wall diametrically decreasing for forming a mating valve seat member with said plug with a slope extending into a throat constriction that diametrically increases for forming a venturi opening.

2. The safety release bleeder valve of claim 1, wherein said exterior surface comprises threads on bottom portion and a polygonal shaped top end, wherein said interior throughbore comprises interior threads at a top end and said venturi throat constriction at a bottom end, and wherein said aperture extends from said interior throughbore through said exterior surface of said barrel.

3. The safety release bleeder valve of claim 2, wherein said interior threads at said top end of said interior throughbore enables threadable mounting of said plug therein.

4. The safety release bleeder valve of claim 1, wherein said top end of said barrel has a polygonal shape and is configured to receive a tool for applying torque during installation and removal of said safety release bleeder valve, and wherein the bottom end of said barrel comprises exterior tapered threads for sealingly mounting said barrel to a pressurized vessel or pipe.

5. The safety release bleeder valve of claim 1, wherein said plug terminates in a tapered shaft correspondingly sized to said venturi throat constriction of said barrel for maintaining said venturi opening free of debris, while minimizing plugging and releasing pressure behind said plug in a controlled manner.

6. The safety release bleeder valve of claim 1, wherein said barrel comprises a wall with said aperture serving as vent between said interior throughbore and said exterior surface of said barrel.

7. The safety release bleeder valve of claim 1, wherein said interior socket of said plug is configured to receive a driver tool to move said plug between an open venting state and a closed non-venting state.

8. The safety release bleeder valve of claim 1, wherein said shaft portion of said plug comprises circumferential channels for receiving gaskets for preventing contact between said gaskets and said interior threads of said interior throughbore of said barrel.

9. The safety release bleeder valve of claim 1, further comprising a plug fastener for preventing displacement of latching between said plug and said barrel.

10. The safety release bleeder valve of claim 9, wherein said plug fastener is a lock nut.

11. The safety release bleeder valve of claim 1, wherein said safety release bleeder valve is manufactured using black oxide.

* * * * *